US009154028B2

(12) United States Patent
Wang

(10) Patent No.: US 9,154,028 B2
(45) Date of Patent: Oct. 6, 2015

(54) APPARATUS AND METHOD FOR CONTROLLING CHARGE PUMP

(71) Applicant: Meng Wang, Tianjin (CN)

(72) Inventor: Meng Wang, Tianjin (CN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 33 days.

(21) Appl. No.: 14/165,598

(22) Filed: Jan. 28, 2014

(65) Prior Publication Data

US 2014/0266410 A1 Sep. 18, 2014

(30) Foreign Application Priority Data

Mar. 12, 2013 (CN) .......................... 2013 1 0167146

(51) Int. Cl.
| G05F 1/10 | (2006.01) |
| G05F 3/02 | (2006.01) |
| H02M 3/07 | (2006.01) |
| H02M 1/00 | (2007.01) |

(52) U.S. Cl.
CPC ............... *H02M 3/07* (2013.01); *H02M 3/073* (2013.01); *H02M 2001/0019* (2013.01)

(58) Field of Classification Search
CPC . H02M 3/073; H02M 3/07; H02M 2003/077; G11C 5/145; G05F 3/205
USPC ....................................... 327/536; 363/59–60
See application file for complete search history.

(56) References Cited

U.S. PATENT DOCUMENTS

| 6,018,264 | A   | * | 1/2000 | Jin ................................. 327/536 |
| 6,294,950 | B1  |   | 9/2001 | Lee et al. |
| 6,774,710 | B2  |   | 8/2004 | Li |
| 7,486,128 | B2  | * | 2/2009 | Yen et al. ....................... 327/536 |
| 7,737,767 | B2  |   | 6/2010 | Oyama et al. |
| 7,973,592 | B2  |   | 7/2011 | Pan |
| 8,098,089 | B2  | * | 1/2012 | Bitonti et al. ................. 327/534 |
| 2006/0197583 | A1 | * | 9/2006 | Yen et al. ....................... 327/536 |
| 2010/0060343 | A1 | * | 3/2010 | Saitoh et al. .................. 327/536 |
| 2011/0018615 | A1 | * | 1/2011 | Pan ................................. 327/536 |
| 2011/0234284 | A1 | * | 9/2011 | Kuwagata ...................... 327/291 |
| 2013/0200943 | A1 | * | 8/2013 | Vilas Boas et al. ............ 327/536 |

OTHER PUBLICATIONS

John F. Dickson, "On-Chip High-Voltage Generation in MNOS Integrated Circuits Using an Improved Voltage Multiplier Technique", IEEE Journal of Solid-State Circuits, vol. SC-11, No. 3, Jun. 1976, pp. 374-378.
Author not known, 8-SRAM Technology, Integrated Circuit Engineering Corporation, circa. 1997, pp. 8-1 to 8-17.
Chi-Chang Wang and Jiin-Chuan Wu, "Efficiency Improvement in Charge Pump Circuits", IEEE Journal of Solid-State Circuits, vol. 32, No. 6, Jun. 1997, pp. 852-860.

* cited by examiner

*Primary Examiner* — Quan Tra
(74) *Attorney, Agent, or Firm* — Charles Bergere

(57) ABSTRACT

An apparatus for controlling a charge pump includes a current sensor arranged to output a current sense signal that is linearly proportional to an output current of the charge pump, and an oscillator that provides a clock signal for the charge pump. The oscillator receives the current sense signal and uses it to vary an oscillation frequency of the clock signal. An amplitude of the clock signal also may be varied in response to the current sense signal.

7 Claims, 6 Drawing Sheets

US 9,154,028 B2

APPARATUS AND METHOD FOR CONTROLLING CHARGE PUMP

BACKGROUND OF THE INVENTION

The present invention relates to charge pumps and, more particularly, to an apparatus and method for controlling a charge pump.

A charge pump is a circuit for providing an output voltage that is greater than its input voltage. There are many known charge pump circuits that use energy storage elements such as capacitors to control the output voltage. The connection of a load to the output of a charge pump has been observed to cause the output voltage of the charge pump to decrease as load current increases, which can make it difficult for the charge pump to generate a high voltage with high loading current.

It would be advantageous to address the above-mentioned limitations in current charge pumps.

BRIEF DESCRIPTION OF THE DRAWINGS

Details, aspects and embodiments of the invention will be described, by way of example, with reference to the drawings. In the drawings, like reference numbers are used to identify like or functionally similar elements. Elements in the figures are illustrated for simplicity and clarity and have not necessarily been drawn to scale.

DETAILED DESCRIPTION OF PREFERRED EMBODIMENTS

The present invention provides an apparatus and method for controlling a charge pump circuit and an apparatus including a charge pump circuit. The present invention provides a charge pump incorporating load current based regulation. The present invention dynamically senses the load current, which allows both clock frequency and amplitude to be regulated. This improves the dynamic working range of the charge pump and allow for output voltage to be maintained when load current is greater than a predetermined value.

In one embodiment the present invention provides a method of controlling a charge pump circuit, including generating a current sense signal that is linearly proportional to a load current output by a charge pump circuit, and generating a clock signal to control the charge pump circuit, wherein the clock signal is generated in response to the current sense signal such that the clock signal has an oscillation frequency responsive to the current sense signal. The clock signal has a predetermined oscillation frequency that is increased proportional to the load current output by the charge pump circuit. Further, generating the current sense signal comprises mirroring the load current according to a predetermined ratio. The method also may include determining an amplitude of the clock signal responsive to the current sense signal, where the clock signal has a predetermined amplitude which is increased proportional to the load current output by the charge pump circuit. The method also may include generating a disable signal in response to an output voltage of the charge pump exceeding a predetermined voltage, and stopping generation of the clock signal in response to the disable signal.

In another embodiment the present invention provides a charge pump circuit including a plurality of energy storage stages coupled to a supply voltage and sequentially charged in response to a clock signal to generate a charge pump output to a load; a current mirror arranged to mirror a load current provided to the load according to a predetermined ratio and to provide an output proportional to the load current; and an oscillation unit arranged to oscillate at a predetermined frequency to generate the clock signal and to receive the output of the current mirror, wherein the oscillation unit is arranged to increase a frequency of oscillation in response to the current mirror output.

These and other aspects of the invention will be apparent from and elucidated with reference to the embodiments described hereinafter.

The illustrated embodiments of the present invention may, for the most part, be implemented using electronic components and circuits known to those skilled in the art and therefore, details will not be explained in any greater extent than that considered necessary for the understanding and appreciation of the underlying concepts of the present invention and in order not to obfuscate or distract from the teachings of the present invention.

Figure 1:
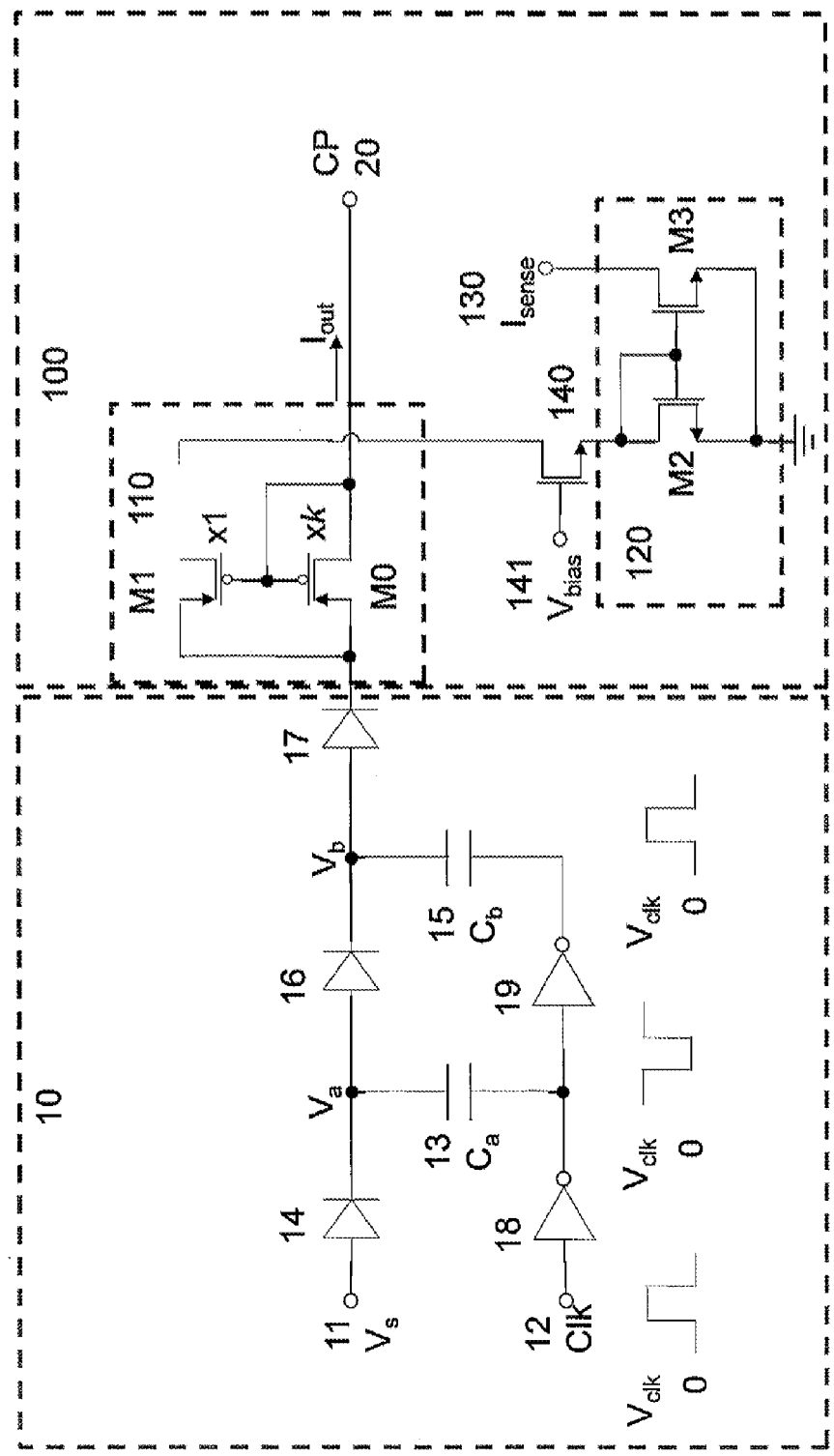
FIG. 1 schematically shows a charge pump circuit and a current monitoring unit according to an example of the invention.

FIG. 1 illustrates a charge pump circuit 10 and a current sensing unit 100 according to an example of the invention. The current sensing unit 100 is arranged to monitor the charge pump circuit 10 and to provide an output 130 which is linearly proportional a current output by the charge pump circuit 10.

The charge pump circuit 10 is an example charge pump circuit. It will be appreciated that a variety of charge pump circuits may be used which receive an input voltage $V_s$ 11 and a clock signal Clk 12 and output a voltage signal CP 20 in response thereto. Although the signal CP 20 is shown as being provided from the current sensing unit 100 the signal is not modified by the current sensing unit 100 and is thus described as being output by the charge pump circuit 10. The voltage of the signal CP 20 output by the charge pump circuit 10 may be greater than the input voltage Vs 11.

The illustrative charge pump circuit 10 may comprise a plurality of stages divided by diodes 14, 16, 17 wherein each stage comprises a respective capacitor 13, 15. The clock signal Clk 12 may be received by a first inverter 18 and a second inverter 19 is arranged such that the first stage is provided with an inverted form of the clock signal Clk 12.

The illustrative charge pump circuit 10 shown in FIG. 1 receives, as its input voltage 11, a power supply voltage $V_s$ and the clock input Clk 12 from an oscillator. The clock input Clk 12 may be a square wave signal, although other signal shapes may be envisaged. When Clk 12 is high a first capacitor $C_a$ 13 is caused to charge to a voltage $V_s-V_d$ where $V_d$ is a voltage drop across a diode 14 arranged between $V_s$ and $V_a$. When the signal Clk 12 is low, a bottom plate of the first capacitor $C_a$ 11 is high and its output voltage $V_a$ is increased to a voltage $V_s+V_{clk}-V_d$ where $V_{clk}$ is a voltage of the clock signal Clk 12. A second capacitor $C_b$ 15 is charged from the increased output voltage of the first capacitor $C_a$ 11 whilst, at the same time, a bottom plate of the second capacitor $C_b$ 15 is low so that a voltage across the second capacitor $C_b$ 15 is $V_s+V_{clk}-2V_d$. When Clk 12 is high again in a next clock cycle, the bottom plate of the second capacitor $C_b$ 15 is high and its output voltage $V_b$ is increased to a voltage $V_s+2V_{clk}-2V_d$. The signal CP 20 provides an output voltage of the charge pump 10 and has a voltage of $V_s+2V_{clk}-3V_d$ which settles to form a stable voltage after several clock cycles of Clk 12 once the first and second capacitors $C_a$ 13 and $C_b$ 15 are charged.

It can be appreciated that if the charge pump 10 output CP 20 is subject to a loading current then the capacitors $C_a$ 13 and $C_b$ 15 continually charge and discharge. The voltage across the load is $$V_t = \frac{I_{out}}{C \times f}$$

where f is an oscillation frequency of the clock signal Clk 12. The final output voltage $V_{cp}$ of the charge pump 10 provided by the signal CP 20 (assuming $C_a=C_b=C$) is:

$$V_{cp} = V_s + 2V_{clk} - 3V_d - 2\frac{I_{out}}{C \times f}$$

Since the capacitance C is limited by die size and process technology it can be appreciated from the above equation that $V_{cp}$ may be subject to an influence of the loading current $I_{out}$.

Examples of the invention control the frequency f of the clock signal Clk 12 in response to the load current $I_{out}$ which may be linearly measured. Furthermore, in some examples, an amplitude of the voltage $V_{clk}$ of the clock signal Clk 12 provided to the charge pump 10 may be controlled responsive to the load current $I_{out}$.

The current sensing unit 100 shown in FIG. 1 may be arranged to receive the output CP 20 from the charge pump circuit 10 and to monitor the output current $I_{out}$ provided to the load (not shown) via the output CP 20. The current sensing unit 100 outputs a current $I_{sense}$ 130 which is linearly proportional to the charge pump 10 output current $I_{out}$. The current sensing unit 100 may comprise a current mirror 110 formed by a pair of PMOS MOSFETs M0, M1. The output current $I_{out}$ is mirrored from M0 to M1 by a predetermined ratio k which may be set by appropriate geometry design of the MOSFET pair M0, M1 forming the current mirror 110, as will be appreciated. A second current mirror 120 may comprise a further pair of MOSFETs M2, M3, arranged to receive the current output from the first current mirror 110 and to provide the output $I_{sense}$ 130. A MOSFET 140 arranged between the first and second current mirrors 110, 120 may be arranged to receive a gate input signal $V_{bias}$ 141.

The gate input signal $V_{bias}$ 141 may act as a biasing voltage for the MOSFET 140 to control a voltage provided to the second current mirror 120. In some cases, the voltage of the charge pump output signal CP 20 may be very high and, without this MOSFET 140, a high voltage from M1's drain may stress a drain of M2 and thus the gate of M2 & M3 (since M2's gate is connected with the drain). In worst case, such a high voltage will damage M2&M3's gates. The MOSFET 140 may be biased by $V_{bias}$ 141 at a much lower voltage than the output CP 20, so that its source voltage is also lower and less likely to damage the MOSFETS M2&M3. The MOSFET 140 may be an NMOS power MOSFET with high $V_{ds}$ (drain-to-source voltage) capability.

The use of at least one current mirror 110, 120 to provide the current output $I_{sense}$ 130 may avoid a non-linearity associated with monitoring a voltage drop across, for example, a component of the charge pump circuit 10. In examples of the invention the current output $I_{sense}$ 130 may be used to control the frequency f of the oscillator signal Clk 12.

Figure 2:
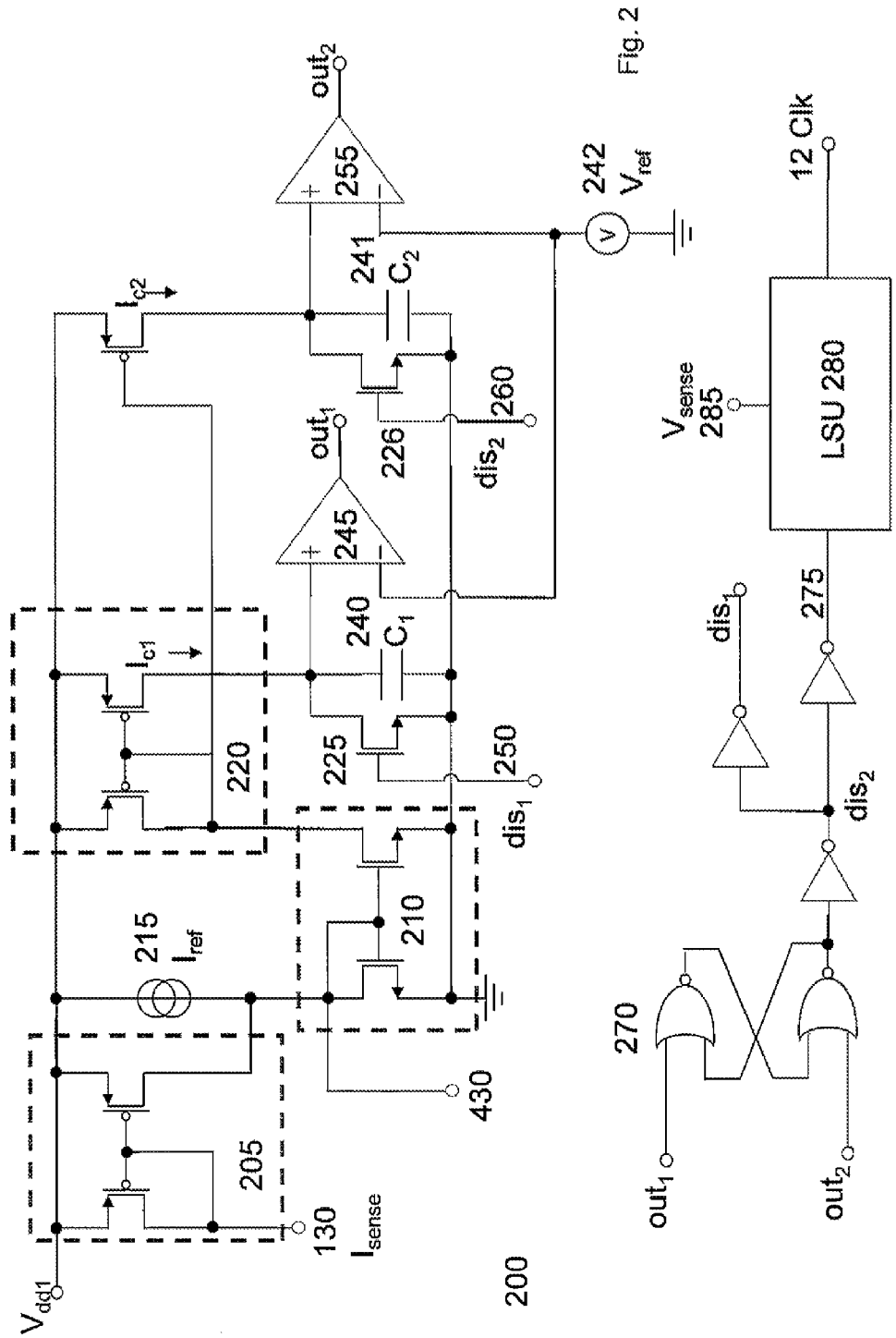
FIG. 2 schematically shows an oscillator unit according to an example of the invention.

FIG. 2 illustrates an oscillator unit 200 according to an example of the invention. The oscillator unit 200 is arranged to receive the current output $I_{sense}$ 130 from the current sensing unit 100 and to output the clock signal Clk 12 having a frequency f which may be controlled proportionally in response to the received current output 130.

The oscillator unit 200 comprises a first current mirror 205 arranged to receive $I_{sense}$ 130 from the current sensing unit 100. A current source 215 is arranged to control a predetermined reference current $I_{ref}$ provided to a second current mirror 210 along with the mirrored version of $I_{sense}$ from the first current mirror 205. The second current source is therefore arranged to receive $I_{sense}+I_{ref}$ and cause a third current mirror 220, having two outputs, to mirror the combined current as $I_{c1}$ and $I_{c2}$.

$I_{c1}$ is a first capacitor charging current provided to charge a first capacitor $C_1$, the voltage across which provides an input 240 of a first comparator 245. A MOSFET 225 is also connected to the input 240 of the comparator 245 and the first capacitor 240. A gate of the MOSFET 225 is connected to a first capacitor control signal $dis_1$. The first capacitor control signal $dis_1$ is an output of cross-coupled NOR gates 270 and is provided to control the charging of the first capacitor $C_1$ 240. When the first capacitor control signal $dis_1$ is high the first capacitor $C_1$ is caused to discharge via the MOSFET 225.

Similarly, the second output of mirror current 220, is a second capacitor charging current $I_{c2}$ and is provided to a second capacitor $C_2$ 241, the voltage across which is provided to an input of a second comparator 255. The charging of the second capacitor $C_2$ 241 is controlled by a MOSFET 226 in response to a second capacitor control signal $dis_2$ 260. The second capacitor control signal $dis_2$ 260 may be an inverse of first capacitor control signal $dis_1$ 250. Thus the first and second capacitors $C_1$, $C_2$ 240, 241 may alternately charge and discharge. A reference voltage $V_{ref}$ 242 is provided to the other inputs of the first and second comparators 245, 255 for comparison against the voltages across the first and second capacitors 240, 241 $C_1$ and $C_2$, respectively. Outputs of the first and second comparators 245, 255 $out_1$ and $out_2$, respectively, are provided as inputs to the cross-coupled NOR gates 270. Thus mirrored versions of the summed current $I_{sense}+I_{ref}$ are used to charge two capacitors $C_1$, $C_2$ and to generate two outputs $out_1$, $out_2$.

The pair of cross-coupled NOR gates 270 form a SR latch and receive the output signals $out_1$, $out_2$ provided from the comparators 245, 255. The first and second capacitor control signals $dis_1$, $dis_2$ may be generated based on the output of the latch 270 to control the charging and discharging of the capacitors $C_1$, $C_2$ 240, 241. Since the charging current of the capacitors $C_1$, $C_2$ is a mirrored version of the summed current based on $I_{sense}$ 130, the frequency f of the oscillator unit 200 is controlled in response to $I_{sense}$ 130 and, consequently, the load current $I_{load}$ of the charge pump 10. In response to increasing load current, the frequency of oscillation of the oscillation unit 200 may be increased. In this way the frequency of charging of charge pump 10 capacitors $C_a$, $C_b$ 13, 15 may be increased and, as can be appreciated from the above explanation, the voltage drop in the output voltage of the charge pump may reduced by controlling the frequency of oscillation of the oscillator unit 200 in response to the substantially linear measurement of the load current output from the charge pump 10.

In some examples of the invention, the voltage amplitude of the clock signal Clk 12 may be controlled in response to the load current of the charge pump 10 by a level shift unit (LSU)

280. An inverted version 275 of the second capacitor control signal dis$_2$ 275 is provided to the LSU 280 along with a voltage signal V$_{sense}$ 285 which may have a magnitude proportional to the output current I$_{sense}$ 130 of the current sensing unit 100. Timing of the clock signal Clk 12 may be controlled by the input 275 based on the second capacitor control dis$_2$, although it will be appreciated that it may be based on the first capacitor control signal dis$_1$, whilst a voltage level of the clock signal Clk 12 may be controlled in response to the voltage of the received signal V$_{sense}$ 285.

Figure 3:
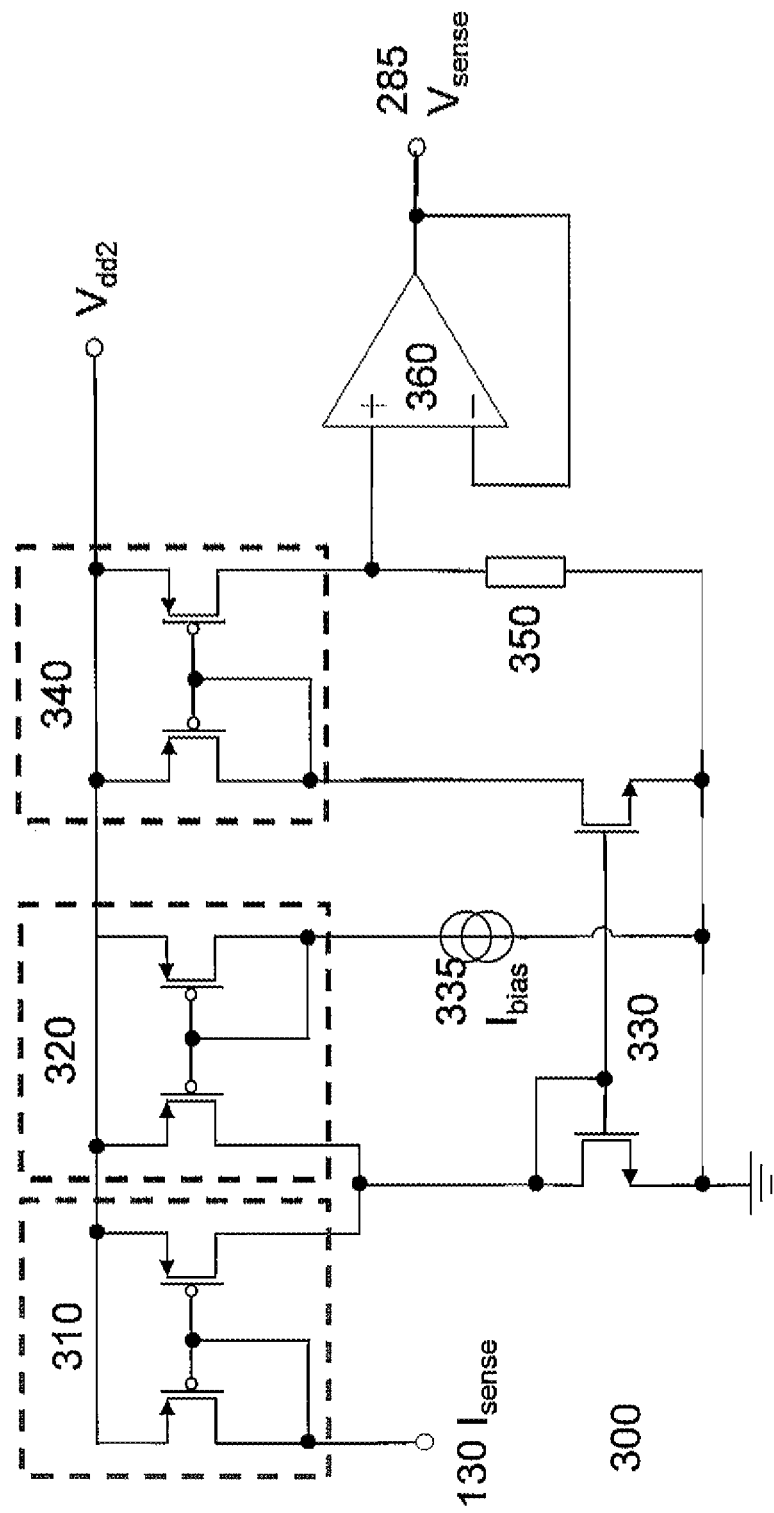
FIG. 3 schematically shows an oscillation level control unit according to an example of the invention.

An oscillation level control unit 300 according to an example of the present invention is shown in FIG. 3. The oscillation level control unit may be arranged to provide the voltage control signal V$_{sense}$ received by the LSU 280. The oscillation level control unit 300 comprises a first current mirror 310 which is arranged to receive, as an input, I$_{sense}$ 130. The first current mirror 310 is arranged to mirror I$_{sense}$ 130 and to output the mirrored current. A second current mirror 320 is arranged to mirror a reference current I$_{bias}$ provided from a current source 335. A summation of the mirrored version of I$_{sense}$ and I$_{bias}$ is received by third and fourth current mirrors 330, 340 which are arranged to cause a mirrored version of the same current to pass through a resistor 350. Thus a voltage V$_r$ across the resistor 350 is based on I$_{sense}$ 130 and, consequently, the load current I$_{load}$ of the charge pump 10. An op amp 360 may be arranged to buffer the voltage V$_r$ across the resistor 250 to provide the voltage control signal V$_{sense}$ 285 to the LSU 280.

Figure 4:
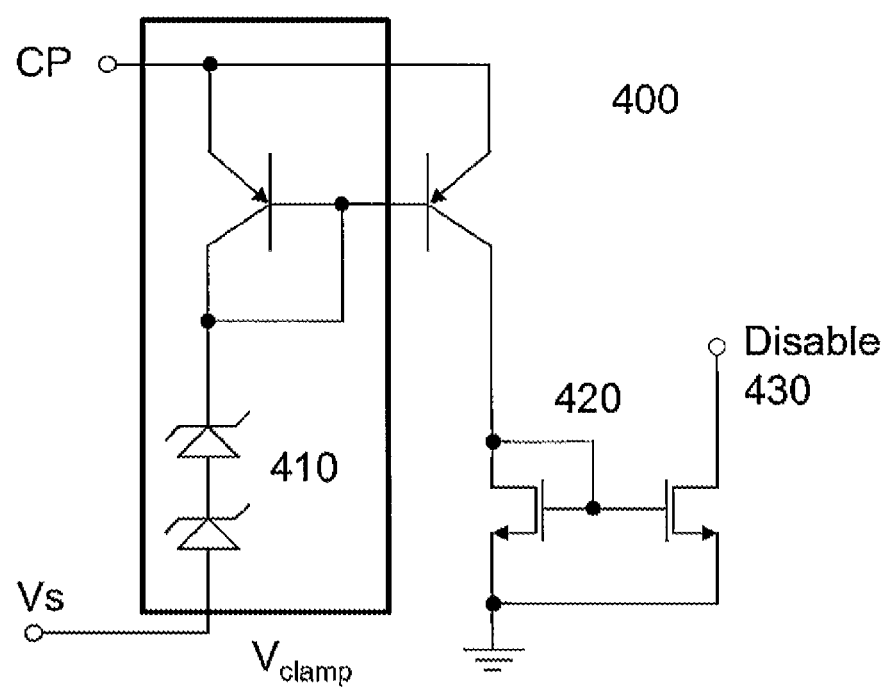
FIG. 4 shows a clamp circuit according to an example of the invention.

In order to prevent over-voltage of the charge pump 10 i.e. the charge pump 10 outputting too high a voltage, some examples of the invention may comprise an over-voltage detection unit 400. An over-voltage detection unit 400 according to an example of the invention is shown in FIG. 4.

The over-voltage detection unit 400 may be arranged to receive the output CP 20 of the charge pump 10 and, in response to the output 20 exceeding a predetermined voltage, generate a disable signal. The over-voltage detection unit 400 may comprise one or more diodes and, in the example shown in FIG. 4, comprises two series zener diodes and a diode-connected PNP transistor 410. The unit 400 may further comprise a current mirror 410. The zener diodes and transistor may act as a clamp between CP 20 and the supply voltage V$_s$. A clamp voltage V$_{clamp}$ is a sum of the breakdown voltages of the zener diodes and transistor's one diode voltage drop. When CP's 20 voltage is higher than V$_s$+V$_{clamp}$, a current is caused to flow through the transistor. The current may be mirrored by the current mirror 420 to generate a disable signal 430. The disable signal 430 may be used to disable the oscillator unit 200 so that the voltage of the charge pump output CP 20 may decrease in response thereto. In one example, the disable signal 430 may be a current pull down signal for sinking current to prevent charging of one or both of the first and second capacitors C$_1$ 240 or C$_2$ 241 in the oscillation unit 200. The disable signal 430 may be connected to optional connection 430 shown in FIG. 2 to sink the I$_{sense}$ current mirrored by the first current mirror 205 and reference current provided by current source 215. Therefore, responsive to the disable signal 430, the oscillation of oscillation unit 200 may be stopped.

Figure 5:
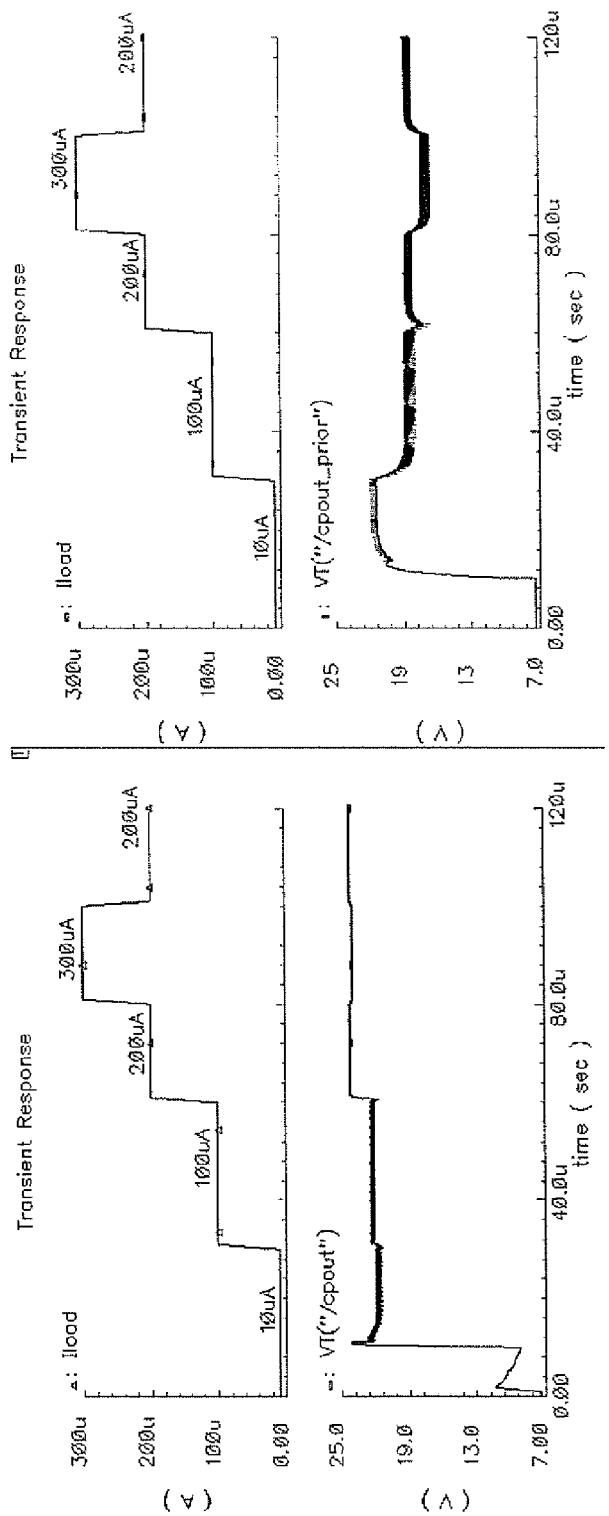
FIG. 5 shows a simulation result of an apparatus according to an example of the invention.

An operation of an example of the present invention is illustrated by FIG. 5. FIG. 5 illustrates a simulation of load current and charge pump output CP 20 voltage for a charge pump 10 controlled by an example of the invention and a prior art charge pump. The right hand side illustrates the response of the prior art charge pump wherein it can be observed that as the load current increases the charge pump output voltage CP decreases. The left hand side illustrates a simulation result of a charge pump 10 controlled according to an example of the invention without an over-voltage detection unit 400. It can be appreciated that the charge pump output voltage CP may be less reduced with increasing load current.

Figure 6:
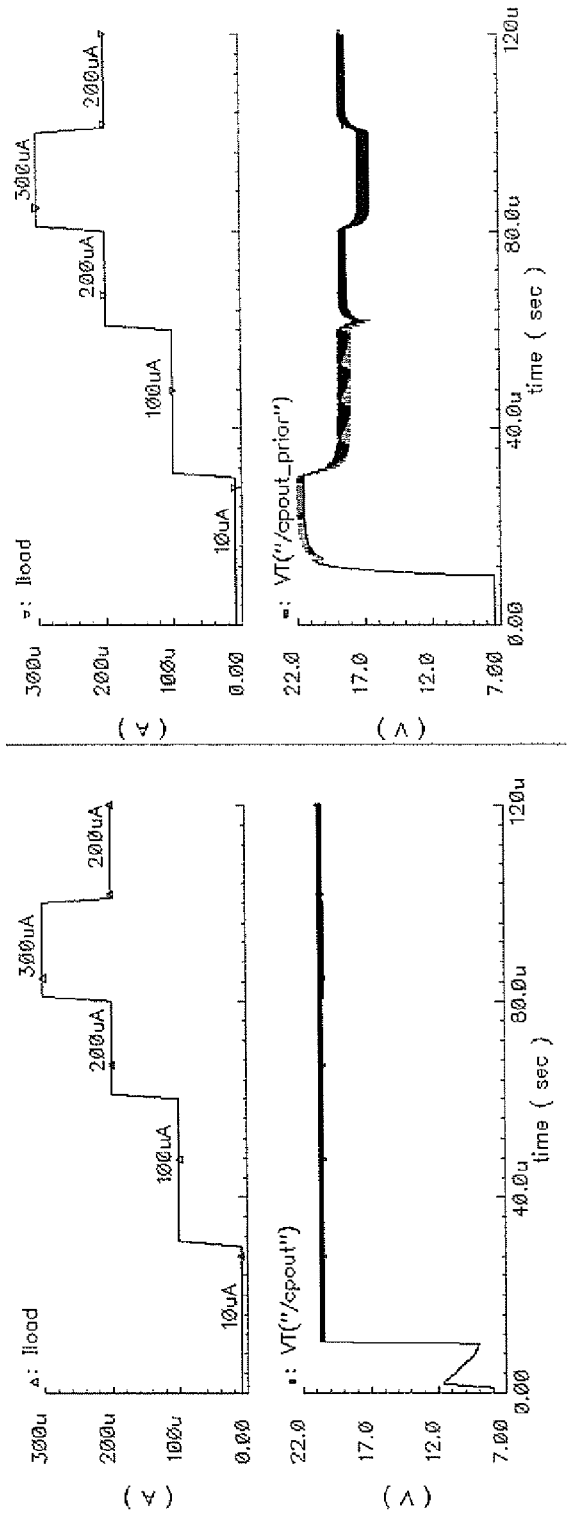
FIG. 6 shows a simulation result of an apparatus according to an example of the invention.

FIG. 6 illustrates a simulation of the prior art charge pump output voltage in its right hand side, as with FIG. 5. The left hand side illustrates a simulation result of a charge pump controlled according to an example of the invention with an over-voltage detection unit 400 according to an example of the invention. A stability of the charge pump output voltage CP 20 with increasing load current may be appreciated.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the current sensing unit may be combined with the oscillation unit.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the various units described herein may be implemented within a single integrated circuit. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, the word 'comprising' does not exclude the presence of other elements or steps then those listed in a claim. The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An apparatus for controlling a charge pump, comprising:
   a current sensing unit arranged to output a current sense signal that is linearly proportional to an output current of a charge pump;
   an oscillator unit connected to the current sensing unit and arranged to provide a clock signal for the charge pump, wherein the oscillator unit receives the current sense signal and varies an oscillation frequency of the clock signal in response thereto; and
   an oscillation level control unit that receives the current sense signal and varies an amplitude of the clock signal in response thereto,
   wherein the oscillation level control unit applies to a resistive load a current responsive to the current sense signal and a predetermined bias current, and generates a voltage responsive thereto.

2. The apparatus of claim 1, wherein the current sensing unit comprises a current mirror arranged to generate the current sense signal as a predetermined ratio mirror of the output current of the charge pump.

3. The apparatus of claim 1, wherein the oscillation frequency of the oscillator unit is arranged to increase from a predetermined oscillation frequency in response to the current sense signal.

4. An apparatus for controlling a charge pump, comprising:
   a current sensing unit arranged to output a current sense signal that is linearly proportional to an output current of a charge pump; and
   an oscillator unit connected to the current sensing unit and arranged to provide a clock signal for the charge pump, wherein the oscillator unit receives the current sense signal and varies an oscillation frequency of the clock signal in response thereto, wherein the oscillator unit comprises first and second capacitors arranged to each be charged by a current based upon the current sense signal, and wherein the oscillator unit comprises first and second comparators arranged to receive at respective first inputs a voltage across the first and second capacitors and, at a second input, a reference voltage.

5. The apparatus of claim 4, wherein the outputs of the first and second comparators are provided to respective inputs of a latch and an output of the latch is arranged to provide a first and second disable signals to disable charging of the first and second capacitors, respectively.

6. The apparatus of claim 1, wherein the oscillation unit comprises a level shift unit arranged to output a clock signal to the charge pump having an amplitude responsive to the current sense signal.

7. A charge pump comprising the apparatus as claimed in claim 1.

* * * * *